(12) United States Patent
Newman

(10) Patent No.: US 6,873,985 B2
(45) Date of Patent: Mar. 29, 2005

(54) LIGHTWEIGHT SUBJECT INDEXING FOR E-MAIL COLLECTIONS

(75) Inventor: Paula S. Newman, Los Altos, CA (US)

(73) Assignee: Xerox Corporation, Stamford, CT (US)

(*) Notice: Subject to any disclaimer, the term of this patent is extended or adjusted under 35 U.S.C. 154(b) by 426 days.

(21) Appl. No.: 09/683,274

(22) Filed: Dec. 6, 2001

(65) Prior Publication Data

US 2003/0110162 A1 Jun. 12, 2003

(51) Int. Cl.[7] .............................................. G06F 17/30
(52) U.S. Cl. ................................. 707/7; 707/1; 707/4
(58) Field of Search ........................... 707/1–10, 104.1; 709/204; 702/1; 382/306, 155

(56) References Cited

U.S. PATENT DOCUMENTS

| | | | |
|---|---|---|---|
| 5,689,715 A | 11/1997 | Crump et al. | 713/310 |
| 5,708,825 A | 1/1998 | Sotomayor | 715/501.1 |
| 5,960,383 A | 9/1999 | Fleishcer | 704/8 |
| 6,167,368 A | 12/2000 | Wacholder | 709/9 |
| 6,236,768 B1 * | 5/2001 | Rhodes et al. | 382/306 |
| 6,647,383 B1 * | 11/2003 | August et al. | 707/3 |
| 2002/0143871 A1 * | 10/2002 | Meyer et al. | 709/204 |
| 2003/0105589 A1 * | 6/2003 | Liu et al. | 702/1 |

* cited by examiner

*Primary Examiner*—Charles Rones
(74) *Attorney, Agent, or Firm*—Oliff & Berridge, PLC

(57) ABSTRACT

A light weight subject indexing system including a candidate headword identification system for identifying candidate words in the subject line of a document which are not listed in a user modified common word list, a lexical context system for creating lexical context for an identified candidate headword, a ranking system for ranking all the candidate headwords identified for the subject lines of a document or message collection, and selecting among the ranked headwords for inclusion in an index based on that ranking, and an index creation system for listing candidate headwords selected by the ranking system.

35 Claims, 10 Drawing Sheets

LIGHTWEIGHT SUBJECT INDEXING FOR E-MAIL COLLECTIONS

BACKGROUND OF THE INVENTION

1. Field of the Invention

The invention relates to a topic identification system for email collections and an indexing system for email subject lines 2. Description of Related Art A fairly new type of document collection is a collection of stored email messages. Such a collection may consist of some messages received by one or more individuals who explicitly store the messages in the collection, in which case the collection is often referred to as a "folder". Such a collection may alternatively comprise of all the messages sent to a "discussion list", in which case a manual or automated "list manager" may store the messages and forward them to all the subscribers to the list.

A discussion list may be public or private, and the subscribers may represent members of an administrative unit, a working group, or just a collection of people interested in the subject area covered by the list. We will refer herein below to either type of collection of stored email messages as an archive. The messages placed in an email archive, especially an archive associated with a discussion list, are generally not isolated documents, but form parts of conversations, called "threads". These thread groupings, which may be anywhere from two to several hundred messages in length, conventionally consist of messages having the same subject line in their standard headers. That is, headers formed according to Internet Standard RFC 822, for example, and any standard replacing the latter. For many discussion lists, the subject lines of all but the first message in a thread are usually prefixed by "Re:", and the headers also contain references to earlier messages in the threads.

Email archives, especially archives of discussion lists, are read for many purposes. For example, an engineer can gain a better understanding of the rationale behind a product feature even after the original design engineers are no longer available. An archive may also be read to enable a user to become familiar with the workings of a workgroup and its issues and concerns, research the general subject of a mailing list, or sample public opinion.

SUMMARY OF THE INVENTION

With the increasing size and readership of these archives, it is becoming desirable to provide an overview of the concerns of the collection and to assist in locating subjects of interest. However, the only currently available type of automatically generated "topic overview" for email collections generally consists of lists of subject lines. When the number of unique subject lines in a collection goes beyond a few hundred, the utility of subject line lists for overview purposes is limited. It is as if the "table of contents" of a book contained only a flat (i.e., non hierarchical) list of the subject of each paragraph. Furthermore, while information retrieval mechanisms based on full text indexing are sometimes available for searching the archives, their usage is predicated on users looking for something in particular, rather than on examining the archive to see if it contains something of interest to them.

There has been considerable work in automating the identification of topics covered by a general document collection. This work usually consists of characterizing documents by their contained words and the frequencies of those words, then using a variety of statistically-based methods to group documents by similar word usage profiles, and then, finally, identifying the groupings. The words used in the analysis are usually limited by omitting those found in a "stopword" list, conventionally containing about 500 of the most common words of the language, primarily to limit the size of the analysis. The groups found may be identified by lists of words that most strongly distinguish each group from the others in a statistical sense. The use of conventional stopword lists in these methods rarely affects the actual words found as topic distinguishers, because the words in such lists rarely distinguish a group. The lists of words serving as topic identifiers may be accompanied by, or replaced by, phrases containing some of those words to give some idea of the context in which they are used. Alternatively, by methods such as "TF.IDF" (term-frequency.inverse-document-frequency) the most important words that serve to distinguish document groups may be found more directly, and then listed as topics covered by the collection.

These statistically based topic identification methods discussed above are problematical in several respects with respect to potential use for email topic overviews. First, lists of words characterizing subgroups of documents tend to be scannable as substitutes for overviews only when the collection contains subgroups that are relatively well distinguished as to subject matter, which is often not the case for email archives. Second, email messages tend to be relatively short, and contain considerable repetition of prior messages in the form of excerpted quotes that may not be directly relevant to the quoting message, but the repetitions may cause misleading, and unindicative "topic" words to be found by these methods. This problem worsens if a relatively large number of topics is to be found, suitable for use in indicating whether the corpus contains information of interest to the user. A third problem associated with naming topic groupings relates to the problem of extracting context phrases for topic words. This generally requires some level of sentence parsing, which, in turn, generally requires a substantial lexicon. Unfortunately, email collections often deal with new innovations and thus contain many new words not found in existing lexicons.

This invention addresses these problems by providing a means of topic identification and topic presentation for email archives in the form of a "back of the book" type index to the subject lines of the collection, using a very large stopword list to substantially avoid inclusion of non-indicative terms. The size of the index may be dynamically varied based on the purpose for which it is to be used. Shorter indexes restricted to more frequent terms are suitable as indicators of the more important topics. As the indexes increase in length their use as indicators of whether the collection indeed contains material on subjects of interest to the user also increases. Subentries of the index give the contexts in which the words occur in subject lines. Using subject lines as the source of topic terms is a reasonable approximation of, and may even be more effective than, the use of full messages, because subject lines tend to be very expressive of the topics of the threads they introduce. Also, because subject lines tend to be noun phrases, the search for appropriate contexts for the topic words is significantly simplified, and does not require extensive parsing. At the same time, the analysis method is far less costly in terms of time and space required than conventional methods of topic analysis, because only words in subject lines are involved.

This invention provides a topic overview for email collections in the form of an index containing headwords found in the subject lines in the collection not also found in an a very large stopword list of common words.

The invention separately provides subentries that place headwords in the context of surrounding content words within those subject lines, which content words generally consist of the words surrounding the headword on both sides up to, but not including, a small set of pre-identified "barrier words".

The invention separately provides headwords that are chosen based on their relative importance.

The invention separately provides headwords that are chosen based on a user-specified index length.

The invention separately links the headwords and subentries provided to the threads whose subject lines contain the headwords and/or subentries.

In various systems and methods according to the invention, the invention exploits message subject lines, which tend to be expressive of content so that the words in those lines are likely to indicate the major topic or topics of the message. The invention also exploits the concept that message subject lines tend to be noun phrases. The invention also exploits the concept that many e-mail lists are related to a specific area of interest, such as a particular sport or kind of technology, so that the topic-related words tend to be non-common words.

In various exemplary embodiments of a light weight subject indexing system, the light weight subject indexing system comprises a candidate headword identification system for identifying candidate words in the subject line of a document which are not listed in a user modified common word list, a lexical context system for creating lexical context for an identified candidate headword, a ranking system for ranking the members of a collection of identified candidate headwords and selecting among them based on their relative rank, and an index creation system for listing selected candidate headwords.

In various exemplary embodiments of a method for creating light weight subject index, the method comprises the steps of identifying candidate words in the subject line of a document which are not listed in a user modified common word list, creating lexical context for the identified candidate word, ranking the identified candidate headword in relation to a plurality of identified candidate headwords, selecting among them based on their relative rank, and listing selected candidate headwords based on the results of ranking and selection.

These and other features and advantages of this invention are described in or apparent from the following detailed description of various exemplary embodiments of the apparatuses, systems and methods of this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The following detailed description of various exemplary embodiments of topic identification mechanism for e-mail collections using a lightweight subject indexer according to this invention is directed to one specific type of light weight subject indexer for e-mail collections for the sake of clarity and familiarity. However, it should be appreciated that the principles of this invention, outlined and/or discussed below, can equally be applied to any known or later developed light weight subject indexer for e-mail collections, beyond the light weight subject indexer for e-mail collections discussed herein.

Figure 1:
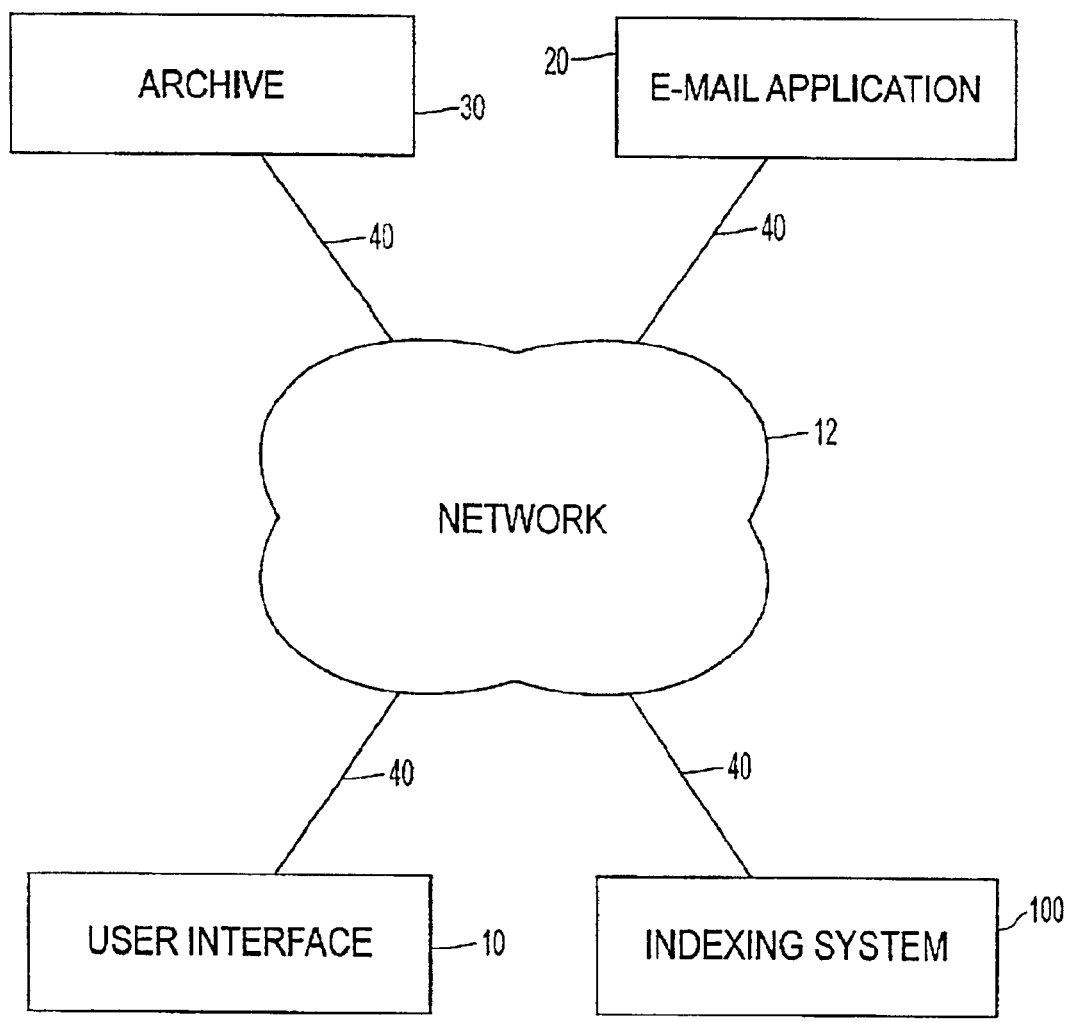
FIG. 1 is a general overview of the system according to one exemplary embodiment of this invention.

As shown in FIG. 1, to perform lightweight subject indexing for e-mail collections, the system includes a user interface 10. Each user interface 10 may be connected through communications link 40 and network 12. When an e-mail message is sent from one user interface 10, via communication links 40 and network 12, to an email application 20 which may be a list server or may be a personal email application directly associated with and controlled by another user interface 10, the recipient, by automated or manual means, may, among other actions not relevant to this invention, store the message within an archive 30.

Also attached to the network 12 is an indexing system 100. The indexing system 100 runs a program, as described below, to create an index for a designated archive to which it has access, which index consists of headwords and subentries. In creating the index a user specifies the requested archive over which the index is to be created via the user interface 10. A signal is then sent to the indexing system 100, either directly or via email application 20, to create the desired index. The indexing system 100 thereafter sends the indexed list to the user interface 10 where the user views the indexed list. The indexing system 100 may be integrated with an email application 20, or may represent a separate service. In another exemplary embodiment, email application 20 may invoke the indexing system 100 to do some incremental preparation for subsequent index creation each time a new message is stored in an archive.

In various exemplary embodiments, the indexing system 100 creates the indexed list by searching through a plurality of e-mail messages for candidate indexing words and appropriate subentries. If some selection is to be performed among the candidate indexing words, or if their relative importance in the collection is to be indicated, the indexing system 100 thereafter ranks the indexed words before presenting the index to the user.

For illustrative purposes, the indexing system 100 will be described for e-mail messages. However, it should be appreciate that other documents with titles which tend to be expressive in content such that the words in those lines are likely to indicate the major topic or topics of the document, with titles which tend to use noun phrases and/or documents which are related to a specific area of interest wherein the topic-related words tend to be non-common words can be used.

Figure 2:
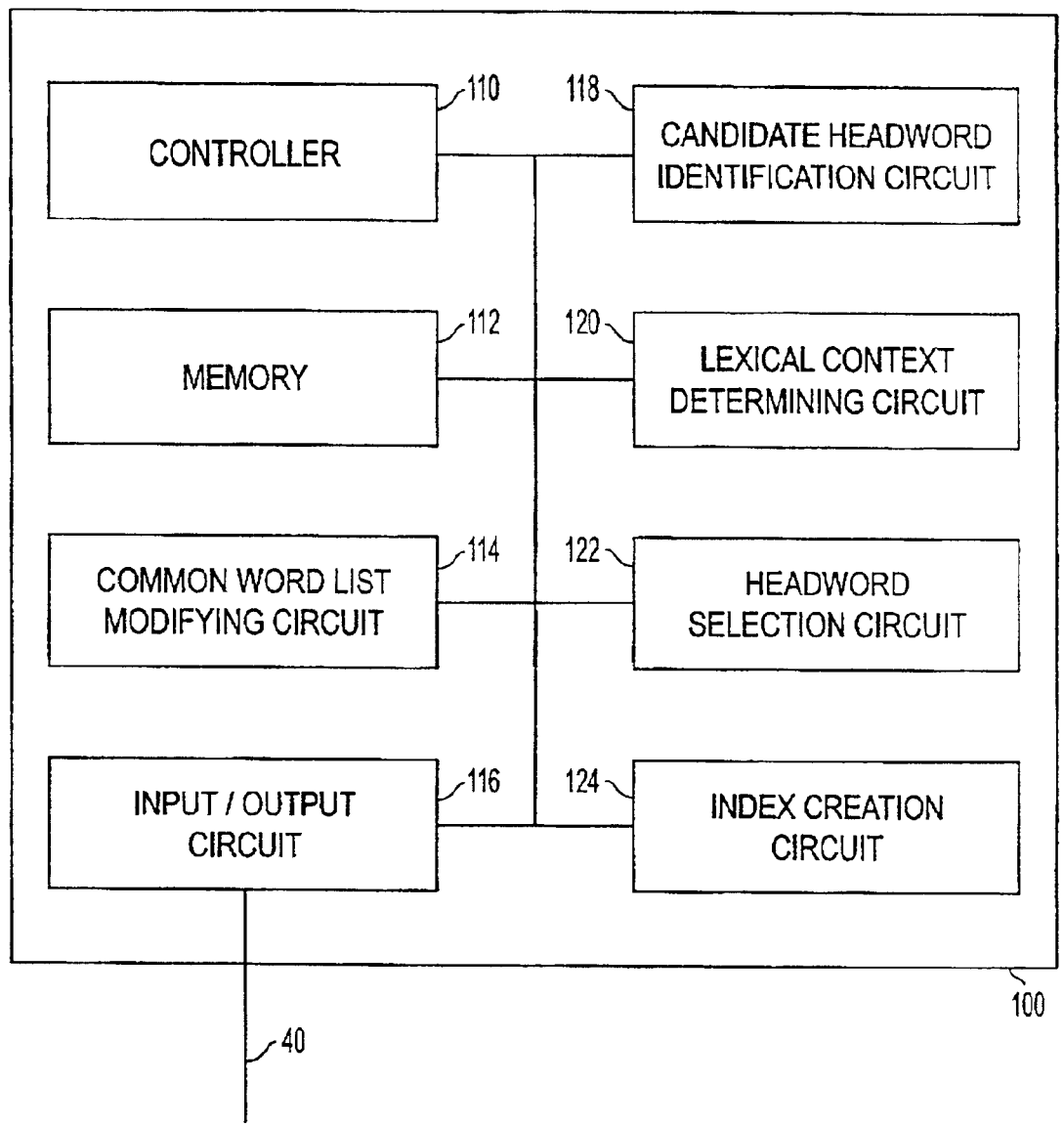
FIG. 2 is a circuit diagram of the indexing system according to one exemplary embodiment of this invention.

FIG. 2 is a circuit diagram for an exemplary embodiment of a light weight subject indexing system 100 for e-mail collections according to this invention. As shown in FIG. 2, the light weight subject indexing system 100 includes a controller 110 for controlling the operations of the indexing system; a memory 112; a common word list modifying circuit 114; a candidate headword identification circuit 118; a lexical context determining circuit 120; a headword selection circuit 122; an index creation circuit 124 connected to an input/output circuit 116 for receiving and transmitting information via the communications link 40.

The light weight subject indexing system 100 includes a common word list modifying circuit 114, used to rule out words as potential headwords. The common word list modifying circuit 114 creates a user modified common wordlist. In creating the user modified common wordlist, the user modified common wordlist circuit obtains a common word list stored in the memory 112. However, it should be apparent that the common word list can be retrieved from any storage location via input/output circuit 116 accessible to communications link 40.

In various exemplary embodiments according to this invention, the common word list is obtained from an independent source and stored in memory 112. For example, the independent source obtains the list by statistically determining words occurring most commonly in a language, which can be found by analyzing a very large collection of documents by standard methods. While it will be appreciated that the number of common words can be varied, the method is most useful if the number of common words is relatively large. For example, for English it might be four or five thousand. The independent source can obtain any number of words characterized as common words. In various other exemplary embodiments, the common words list can be obtained by evaluating the e-mail messages stored in the archive to determine the words that are most commonly used in that archive, and using the resulting list or combining it with the independent source. However, it should be appreciated that any known or later developed technique determining common words may be used in the practice of this invention.

The common word list modifying circuit 114 is activated to modify the common word list. The common word list may be modified by adding words, changing words, translating words or performing any other known or later developed modification to the common words. It will be apparent that the common word list modifying circuit may modify the common word list based on user input, input from an external program or any other triggering method without departing from the spirit and scope of this invention. If the common word list modifying circuit 114 is activated to add additional words, the user may enter words to be added to the common word list using dialog boxes, highlighting or any other known or later developed input method. For example, in a Patent law firm, it may be desirable to include the words "Patent", "Trademark" and/or "Copyright" in the common word list because the words may be so ubiquitous in e-mail messages sent between members of the firm that it would be undesirable to include them in a topic list. However, these words may not be found an initial common word list.

The common word list modifying circuit 114 can also adjust the common word list by subtracting words. Words contained in the initial common word list may be identified and removed. When analyzing all e-mail archive or collection of messages between baseball players, it may be desirable to remove the words "home" and/or "run" from the initial common word list because these words are technical terms for the archive, and therefore should not be ruled out as potential candidate headwords.

After the common word list modifying circuit 114 modifies the initial common word list, a modified common word list may be obtained. The exemplary modified common word list is described with respect to the English language for purposes of description. However, it should be apparent that any language may be used and that different languages may have different common word lists without departing from the spirit and scope of this invention.

The memory 112 maintains, among other things, the data that is accumulated while the documents are scanned and that is subsequently used in creating the index. The data accumulated includes the list of candidate headwords as they are identified and, for each such headword: a) a document occurrence count, indicating the number of documents in which the candidate headword occurs in a subject line; b) the set of unique subject lines in which the candidate headword occurs, and the number of such unique subject lines; and c) lexical context for the candidate headword in each such unique subject line.

The candidate headword identification circuit 118 is activated to identify candidate headwords. In the candidate headword identification circuit 118, a document is first obtained from the archive 30 via input/output circuit 116. If the document is the first one having that subject line (which may be determined by hashed comparisons or, if the archive maintains threaded messages, if the document is the first one in a thread) the candidate headword identification circuit 118 then: a) scans the subject line of the document to identify as candidate headwords those words which do not appear in the user modified common word list; b) checks the memory 112 to see if those candidate headwords have already been identified and adds each one not yet identified to the set of candidate headwords in memory 112; c) associates every candidate headword found for the subject line with that subject line, and stores that association in memory 112; and d) adds a count to the subject line count for every candidate headword found for the subject line.

Regardless of whether the subject line has already been scanned, the candidate headword identification circuit then adds a count to the document occurrence count for every candidate headword in the subject line.

shapeType20fFlipH1 fFlipV0fLockText0shapePath4fFillOK0fFilled0lineWidth 28575lineEndArrowh lexical context determining circuit 120 is activated for each new unique subject line to determin words for each determined candidate headword in that subject line. In various exemplary embo the right of each determined candidate headword are determined as lexical context by includin barrier word on either side. A barrier word is a member of a small, pre-determined set, usually prepositions, pronouns and/or any other words or features which lack significant content. For e Kawasaki motorcycle", the candidate headword is "Kawasaki", and "with" is a barrier word in this context for "Kawasaki" would be simply "motorcycle".

In various exemplary embodiments, if the above procedure finds no words in the lexical context, as would occur, for example, if the candidate headword were "brakes", and the subject line was "How can I stop without brakes", and "without" is a barrier word in this embodiment, a further procedure is used to find the lexical context. This procedure searches beyond barrier words on the left or right to find another content word. If another content word is found, both the intervening barrier words and that content word is added to the lexical context, and the search continues in that direction adding content words until another barrier word is found. In the example "How can I stop without brakes", with candidate headword "brakes", and barrier words "without" and "I", "without" and "stop" would be added to the lexical context, and then "I" would terminate the search. If there are content words (beyond the barrier words) to both the left and right of the candidate headword, heuristic means that may differ depending on the embodiment are used to determine the direction of the further search. For example, if the word following the candidate headword is "of", the search might proceed to the right.

Many different heuristics may be used, such as always searching on the right, or any other known or later developed technique of determining lexical context that heuristically obtains a better sequence. After the lexical context is obtained, it may be expressed in typical index form by (a) omitting the headword from the lexical context entirely if it occurs at the left or right end of the context, and (b) replacing it by an underscore or other omission indicator if it occurs in the middle of the context.

Unless all candidate headwords are to be used in the index, and no indication of relative importance is requested, the headword selection circuit 122 ranks the candidate headwords normally based on count information obtained during candidate headword selection and stored in the memory, or separately developed. If not all candidate headwords are to be used, the headword selection circuit 122 then selects the highest ranked headwords up to the desired index size, that is, up to the desired number of headwords to be displayed.

In various exemplary embodiments according to this invention, the headword selection circuit 122 uses a weighting scheme to rank the candidate headwords which takes into account the number of unique subject lines Nt in which a candidate headword occurs, and the number of individual messages Nm in which the candidate headword occurs in the subject line. For example, a word w might occur in one unique subject line, giving Nt=1 for that word, but there might be 100 messages having that subject line, giving Nm=100. A particular weighting scheme would give more or less importance to these two measures, normally by assigning a weight Wt to the number of subject lines Nt, and a weight Wm to the number of messages Nm, and finding a ranking score (Wt×Nt)+(Wm×Nm) for the candidate headword. As should be appreciated, the weighting scheme can be set by the user or can be set by the headword selection circuit 122 as a default value.

In various exemplary embodiments, the headword selection circuit 122 can set the index size, that is, the number of headwords displayed in the index. The size can be set based on various criteria including a general user indication of size (e.g., small, large) if any, and an interpretation of the user indication of size in terms of a fixed number of headwords, or a percentage of the number of unique subject lines in the archive or any other criteria.

The index creation circuit 124 lists each selected candidate headword in a predetermined order, optionally followed by the lexical contexts in which it appears, or by the actual subject lines in which it appears. The candidate headwords and/or the lexical contexts may be linked to the actual subject lines in which they appear, and to the initial fragments of the first messages with those subject lines. Other mechanisms can then be used to view entire threads having those first messages if desired.

In various exemplary embodiments, the index creation circuit 124 lists the selected headwords in alphabetical order. However, it should be appreciated that any order can be used, for example, the order obtained by the headword ranking obtained by the headword selection circuit 122, or in the (date based) order in which the headwords first appeared in the corpus.

In various other exemplary embodiments, the index creation circuit 124 also considers the number of lexical contexts that are to be placed below a candidate headword as subentries. The user can thus avoid a long index, and thus improve the readability of the index, by avoiding long lists of lexical contexts. If not all the lexical contexts in which a selected candidate headword occurs in a subject line are to be listed below the selected headword as subentries in the index, but, rather, a maximum number m of lexical subentries is set, the lexical contexts for a candidate headword can themselves be ranked. For example, the lexical contexts can be ranked in order of decreasing number of messages whose subject lines contain that lexical context, and those subentries whose rank is larger than a predetermined number can be omitted from the list.

Figure 3:
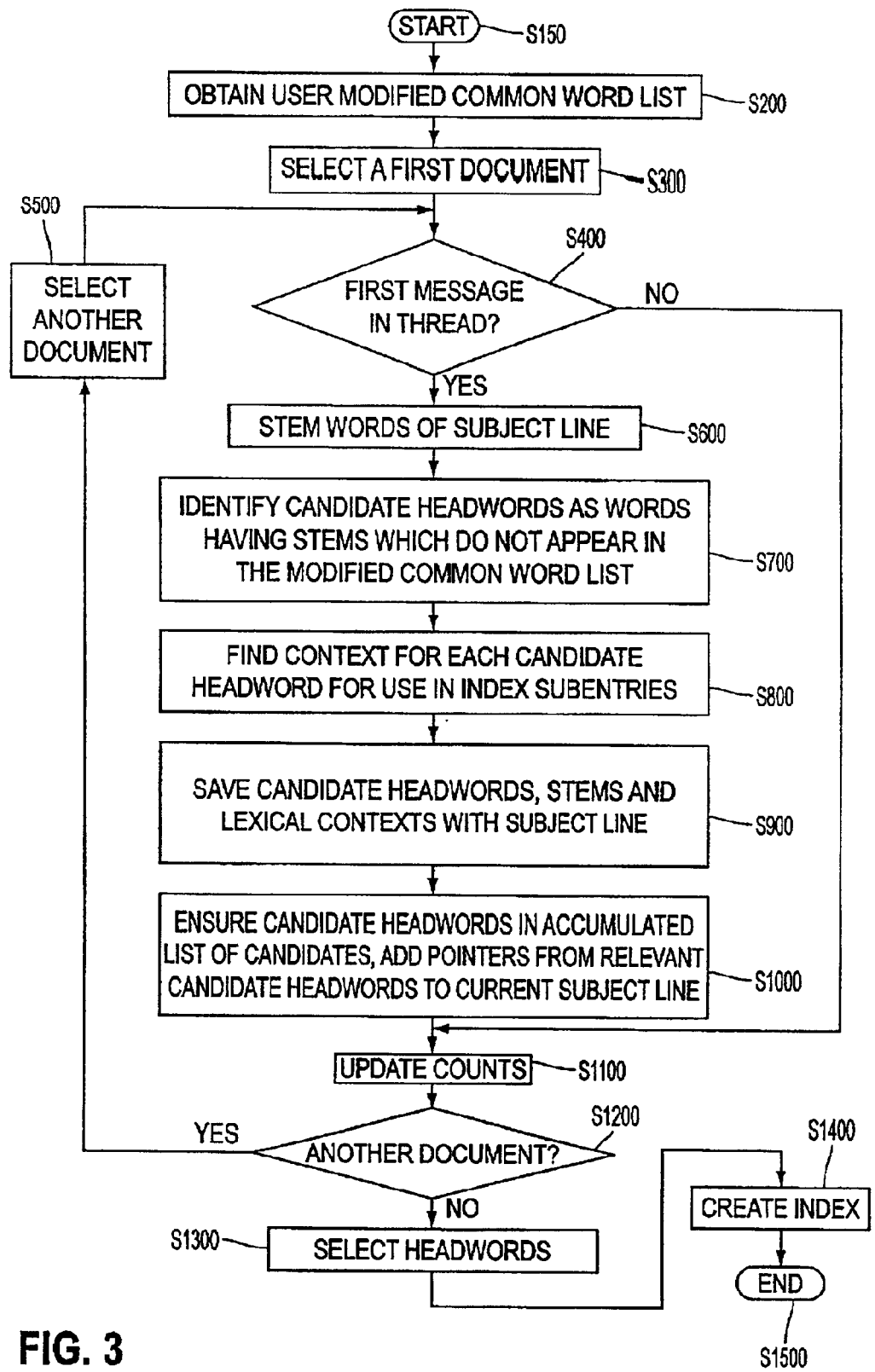
FIG. 3 is a flowchart of the indexing system according to one exemplary embodiment of this invention.

FIG. 3 is a flowchart of the indexing system according to this invention. In operating the indexing system, a plurality of e-mail messages have been stored in an archive 30 by email application 20, either automatically or as directed via user interface 10.

The process begins at step S150 and proceeds immediately to step S200. In step S200, the light weight subject indexing system 100 obtains a user modified common wordlist. Control continues to step S300. In step S300, the light weight subject indexing system 100 selects a first document from the designated archive 30, which may be a personal or shared email folder or an archive maintained by a discussion list server. Control continues to step S400.

In step S400, a determination is made as to whether the message is the first message with a particular subject line in the archive. If the message is the first message, control continues to step S600, otherwise, control continues to step S1100.

In step S600, if the common wordlist has been stemmed, the words of the subject line are also stemmed. Control continues to step S700. In step S700 the candidate headwords are determined as those possibly stemmed words obtained in step S600 that do not appear in the modified common wordlist. Control continues to step S800.

In step S800, the lexical context for each candidate headword in the subject line is determined for use as an index subentry. Control continues to step S900. In step S900, the association between the subject line and its candidate headwords, stems and lexical contexts is saved and control continues to step S1000. In step S1000, any candidate stems, or words if stemming is not done, found in the current subject line but not yet in the accumulated candidate headword list are saved in the accumulated candidate headword list Pointers are also added from the relevant candidate headword list entries in the accumulated candidate headword list to the current subject line. Further, the count of unique subject lines in which each such candidate headword appears is updated. Control continues to step S1100. In step S1100, the count of messages in which each candidate headword in the current subject line appears is updated, and then control continues to step S1200.

In step S1200, the operation determines whether there is another e-mail message to be indexed available in the archive 30. If no additional e-mail messages are to be indexed, control continues to step S1300. Otherwise, control continues to step S500 where another document is selected.

In step S1300, the headwords to be displayed on the user interface are selected. Control then continues to step S1400. In step S1400, an index is created for the display by ordering the selected headwords and adding the subentries if requested. In various exemplary embodiments, the headwords may be placed in alphabetical order. However, it should be apparent that other orders may be used, to aid the user in identifying the location of a headword, or to understand the relative importance of different headwords, or the times they entered the corpus. Control continues to step S1500 and the process ends.

Figure 4:
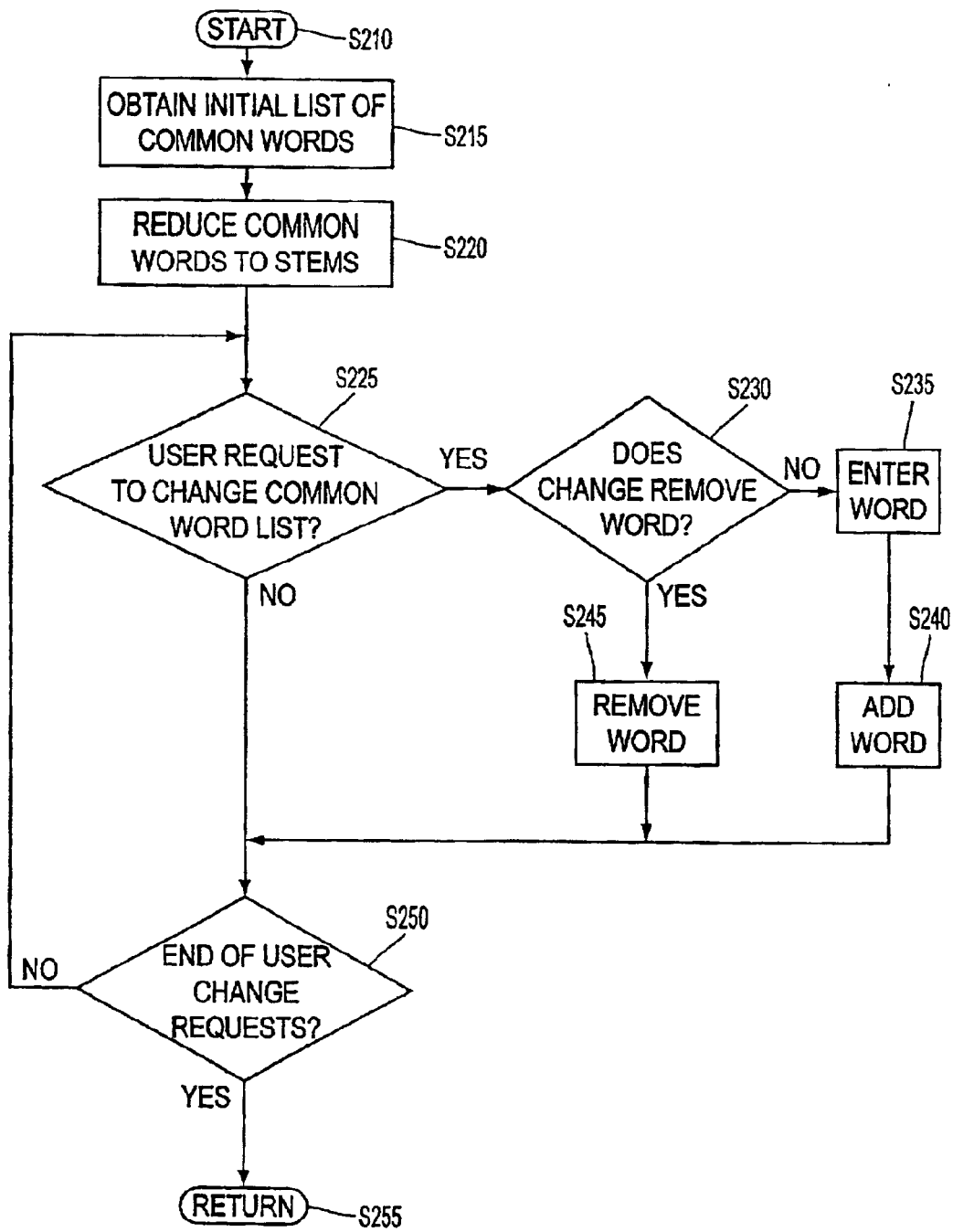
FIG. 4 is a flowchart for obtaining a modified common wordlist according to one exemplary embodiment of this invention.

FIG. 4 is a flowchart for obtaining a user modified common wordlist according to one exemplary embodiment of this invention as found in step S200 of FIG. 3. The process begins at step S210 and proceeds immediately to step S215.

In step S215, an initial list of common words is obtained. In various exemplary embodiments, the initial list of common words may be a predetermined list of words. However, in various other exemplary embodiments, the initial list of common words can be obtained by statistically analyzing a large corpus of documents in the language of the archive to find the most common words, and/or analyzing a large email archive in the subject area, or any other known or later developed technique for determining commonly used words. Also, the initial list of common words may be modified by a user at some time before the indexing system is used to create an index. While the initial list of common words is not limited to any specific number of words, the effectiveness of the invention for the intended purpose requires a fairly large set of such words, far larger than any conventional stopword list size, as the purpose of the common word list is to keep words on the list from being used as candidate headwords. For English, a list containing approximately 5000 of the most common words of the language has been found useful for the intended purpose. Control then continues to step S220.

In step S220, the common wordlist is reduced to stems if so specified either in the particular embodiment or by user option. In reducing common words to stems, the wordlist is transformed to a canonical word list using a standard form for each word. For example, the words "create", "creates", "creating" and "created" may be reduced to the standard form "create". Control continues to step S225.

In step S225, a determination is made as to whether a user wants to change the common wordlist. If the user wants to change the common wordlist, control continues to step S230, otherwise, control continues to step S250.

In step S230, a determination is made as to whether the user wants to add or remove a word. If a user wants to add a word control continues to step S235, otherwise, control continues to step S245 where the user specifies the word to be removed, the word is removed from the common wordlist, and control returns to step S250.

In step S235, the user enters the word to be added to the common wordlist and control continues to step S240. In step S240, the operation adds the word to the common wordlist. Control continues to step S250.

In step S250, a determination is made as to whether the user has finished changing the common wordlist to create the user modified common wordlist If the user has not finished changing the common wordlist, control returns to step S225, otherwise, control continues to step S255 and control returns to step S300 of FIG. 3.

Figure 5:
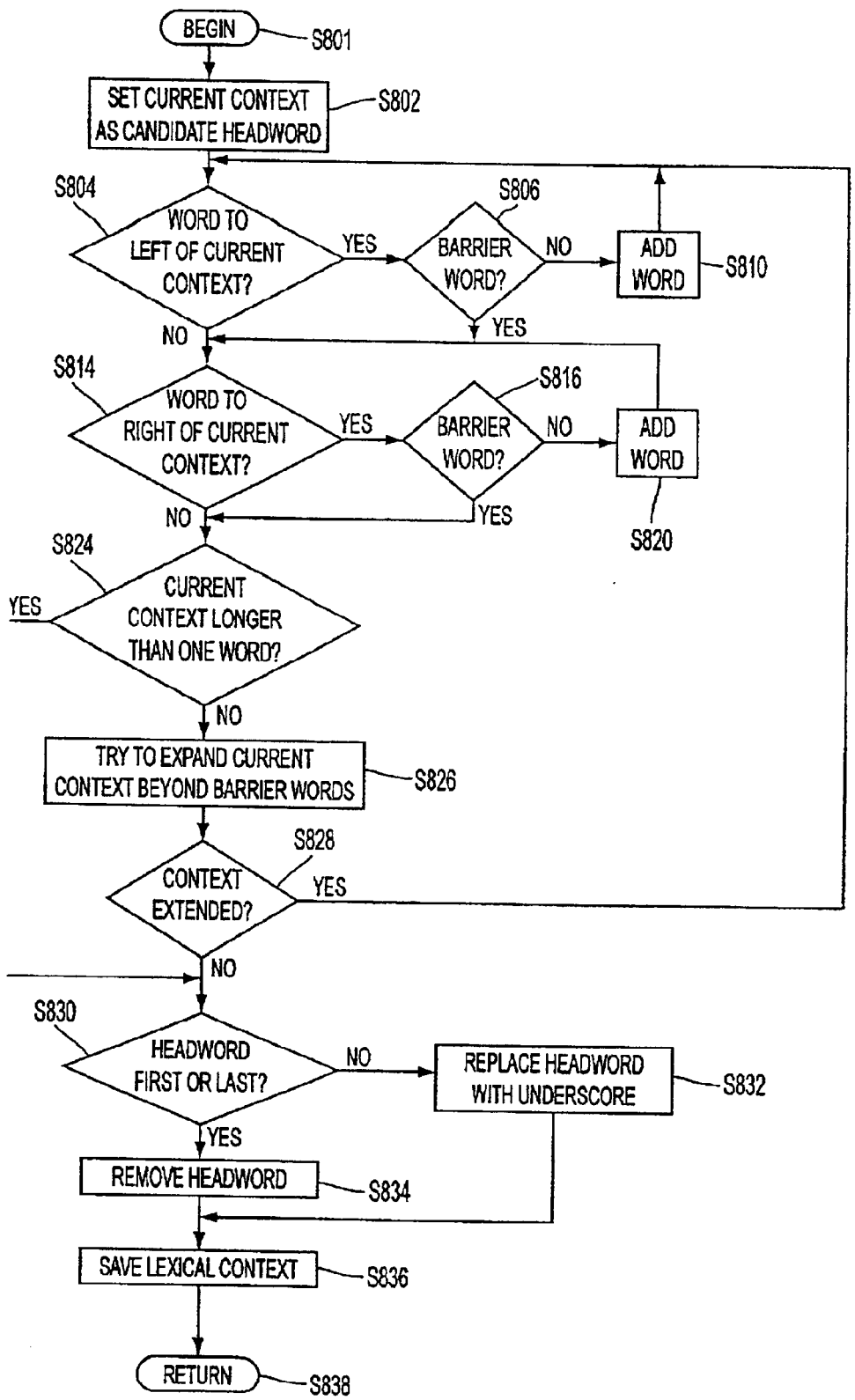
FIG. 5 is a flowchart for finding a lexical context for each candidate headword according to one exemplary embodiment of this invention.

FIG. 5 is a flowchart of an exemplary embodiment for finding a lexical context for each candidate headword in a subject line for use in indexing subentries as found in step S800 of FIG. 3.

Control begins at step S801 and continues immediately to step S802. In step S802 the bounds of the current context are set at the left and right boundaries of the candidate headword in the subject line. Control continues to step S804.

In step S804, a determination is made as to whether there are any words to the left of the current context. If so, control continues to step S806. Otherwise, control continues to step S814.

In step S806, a determination is made as to whether the first word to the left of the current context is a barrier word. A barrier word is usually a small, closed class word such as a determiner, preposition, or pronoun, or a punctuation mark, that is predetermined for the embodiment as not suitable for appearing in an index subentry. If the word is a barrier word, the control continues to step S814, otherwise, the control continues to step S810.

In step S810, the boundary of the current context is extended to contain the word. Then, the control continues to step S804 to determine if there is a word to the left of the previously searched word.

In step S814, a determination is made as to whether there is another word to the right of the current context. If there is such a word, control continues to step S816, otherwise, control continues to step S824.

In step S816, a determination is made as to whether the first word to the right of the current context is a barrier word. The barrier word determiner is similar to the determination in step S806 or could include or exclude other words. If the word is not a barrier word, control continues to step S820. Otherwise, control continues to step S824.

In step S820, the current context is extended to add the new word. Then, control continues to step S814 to determine if there is another word to the right of that word.

In step S824, a determination is made as to whether the current context, including the headword, contains more than one word. If the current context contains more than one word, control continues to step S830. Otherwise, control continues to step S826.

In step S826 an attempt is made to extend the single word context beyond surrounding barrier words in order to provide some lexical context for the candidate headword. After the attempt is made, control continues to step S828.

In step S828, the operation checks whether the procedure of step S826 resulted in any extension of the current context. If so, the extension will have been to just beyond some barrier words, and control continues to step S804 to find additional content words if any beyond those barrier words. If not, control continues to step S830.

In step S830, a determination is made as to whether the headword is the first or last word in the lexical context. If the headword is the first or last word, control continues to step S834 where the headword is removed from the lexical context, and control continues to step S836. Otherwise, control continues to step S832 where the headword in the lexical context is replaced with one or more underscores, and control continues to step S836. In step S836 the operation saves the current lexical context as the lexical context for the candidate headword. The operation then ends at step S838 and control returns to step S900 of FIG. 3.

Figure 6:
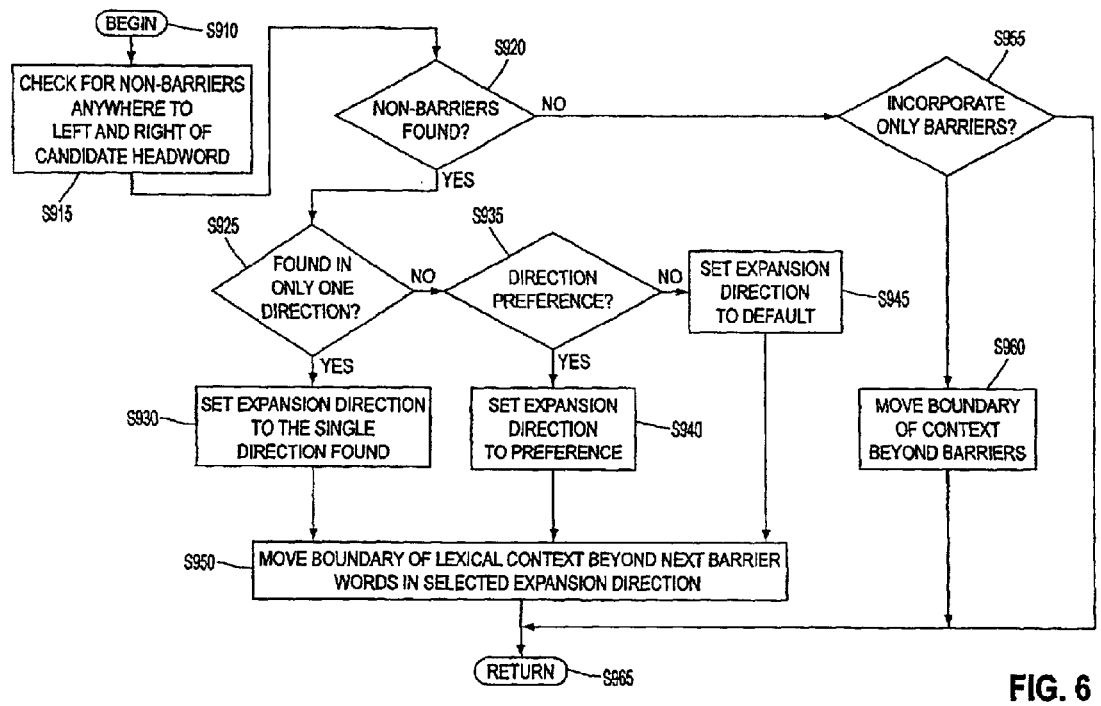
FIG. 6 is a flowchart for extending the lexical context for a candidate headword beyond barrier words according to one exemplary embodiment of this invention.

FIG. 6 is a flowchart of an exemplary embodiment for finding a lexical context for a candidate headword when the only words immediately surrounding the candidate headword are barrier words as found in step S826 of FIG. 5. Control begins at step S910 and continues immediately to step S915. In step 915 the operation checks for the presence of non-barrier words anywhere beyond the barrier words to the left and right of the candidate headword. Control continues to step S920.

In step S920, a determination is made as to whether any non-barrier words were found. If no non-barrier words were found, control continues to step S955. Otherwise, control continues to step S925.

In step S925, a determination is made as to whether the non-barrier words were found in only one direction relative to the candidate headword. If non-barrier words were found in only one direction, control continues to step S930 where the expansion direction is set to that one direction, and control continues to step S950. However, if non barrier words were found in both directions relative to the candidate headword, control continues to step S935.

In step S935, a determination is made as to whether there is a some heuristic preference for one of the two possible expansion directions, based on comparing the barrier words surrounding the candidate headword. For example, for English, the word "of" generally indicates a close connection between the words it connects. If there is such a heuristic preference, control continues to step S940 where the preferred direction is set as the expansion direction. If there is not such a heuristic preference, control continues to step S945 where a default direction associated with the exemplary embodiment is identified as the expansion direction. Once either a heuristically preferred direction or a default direction is chosen, control continues to step S950.

In step S950 the boundary of the lexical context is extended to beyond the set of barrier words in the selected expansion direction. Control continues to step S965.

In step S955, where there are no non-barrier words besides the headword in the subject line, a determination is made as to whether barrier words surrounding the headword, if any, are to be incorporated into the lexical context. Whether such barrier words are to be incorporated depends on the desired appearance of the index. If the barrier words are to be incorporated, control continues to step S960 where all the barrier words surrounding the candidate headword are added to the lexical context and control then continues to step S965. If the barrier words are not to be incorporated into the lexical context, control continues directly to step S965. The operation then ends at step S965 and control returns to step S828 of FIG. 5.

Figure 7:
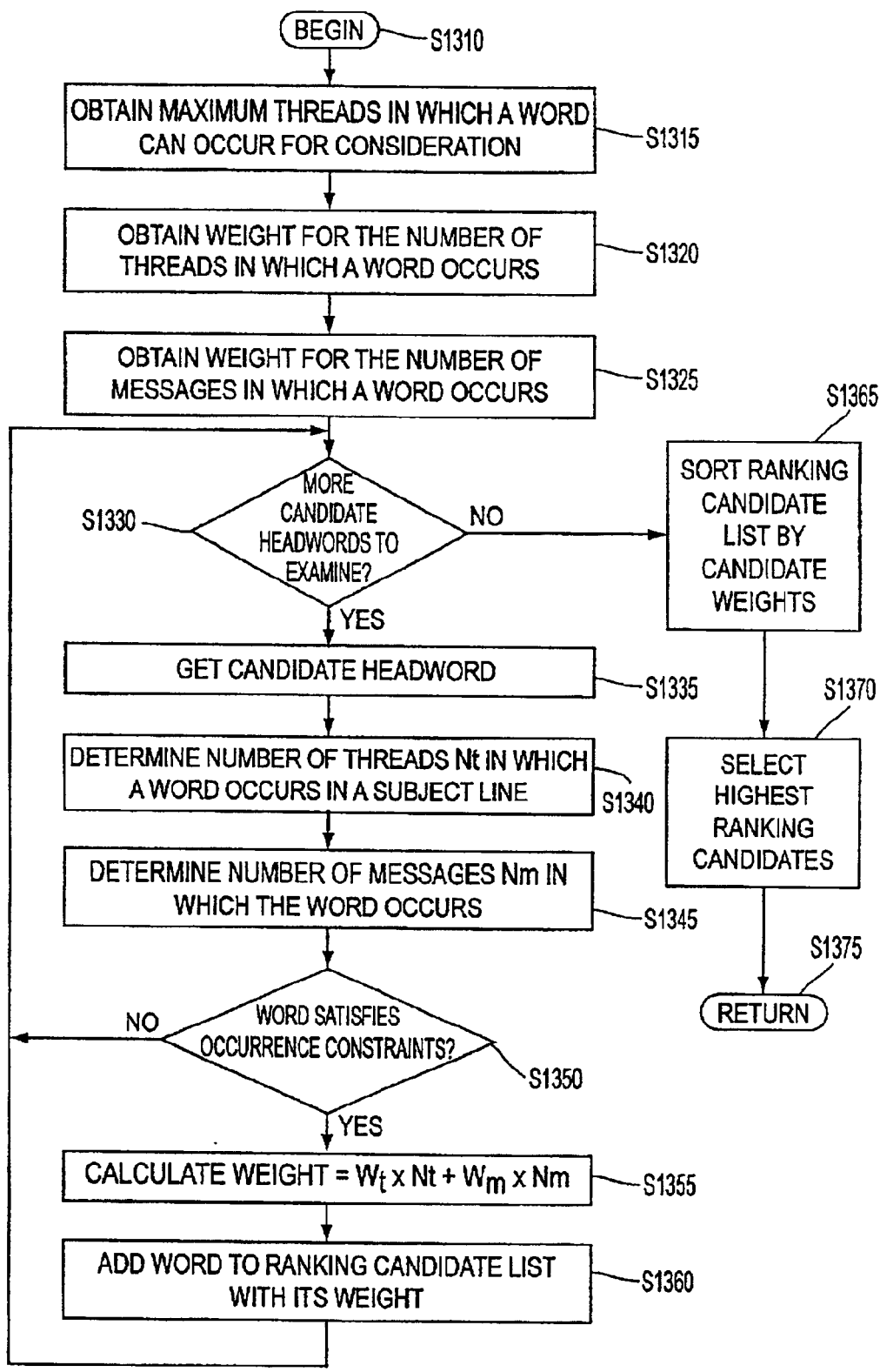
FIG. 7 is a flowchart for ranking candidate headwords and selecting among them for index inclusion according to one exemplary embodiment of this invention.

FIG. 7 illustrates a flowchart for selecting the headwords to be used in the index, as found in step S1300 of FIG. 3.

Control begins at step S1310 and immediately continues to step S1315. In step S1315, the operation obtains the maximum number of unique subject lines or thread subject lines in which a candidate headword can occur for consideration, if any such maximum has been established. Such a maximum can be used to prevent a ubiquitous word local to the archive from being listed, in a different way than by user modification of the common word list. As should be appreciated, such a maximum can occur can be a fixed number, or can be based on a percentage of unique or total subject lines, either built in, or user specified. Control continues to step S1320.

In step S1320, the operation obtains a weight, Wt, determining the extent to which the number of unique subject lines in which a candidate headword occurs will contribute to its rank. Control continues to step S1325. In step S1325, the operation obtains a weight, Wm, determining the extent to which the total number of subject lines in which a candidate headword occurs will contribute to its rank. In various exemplary embodiments, Wt and Wm can be pre-established within the embodiment, and/or can be set by the user before ranking takes place. Control continues to step S1330.

In step S1330, determination is made as to whether there are any more candidate headwords to be examined. If there are more words to be examined, control continues to step S1335, otherwise, control continues to step S1365.

In step S1335 the operation gets the next word to be examined and continues to step S1340. In step S1340, the operation determines the number of unique subject lines Nt in which the current candidate headword occurs. Control continues to step S1345. In step S1345, the operation determines the total number of subject lines Nm in which the candidate headword occurs. Control continues to step S1350.

In step S1350, a determination is made as to whether the total number of unique subject lines Nt in which the current candidate headword occurs is less than the maximum, if any, determined in step S1315. If so, control continues to step S1355. Otherwise, the control returns to step S1330.

In step S1355, the operation calculates the ranking weight of the candidate headword based on the formula (Wt×Nt)+(Wm×Nm). Control continues to step S1360. In step S1360, the operation adds the candidate headword to the candidate ranking list together with its weight. Thereafter, control returns to step S1330.

In step S1365, the candidate ranking list is sorted by candidate weights. Control continues to step S1370. In step S1370, if all of the candidate headwords are not to be included in the index, the operation selects the C highest-ranking candidates. As should be appreciated, C can be a fixed number embedded in the environment, or set by the user, or a varying number representing a function of the archive size, for example, a percentage of the total number of unique subject line. Alternatively, C can be derived from a relative index size specified by the user, e.g., "small" or "large", and an interpretation of that relative size as a fixed number or as function of the archive size. Thereafter, control continues to step S1375 where the process ends and control returns to step S1400 of FIG. 3.

Figure 8:
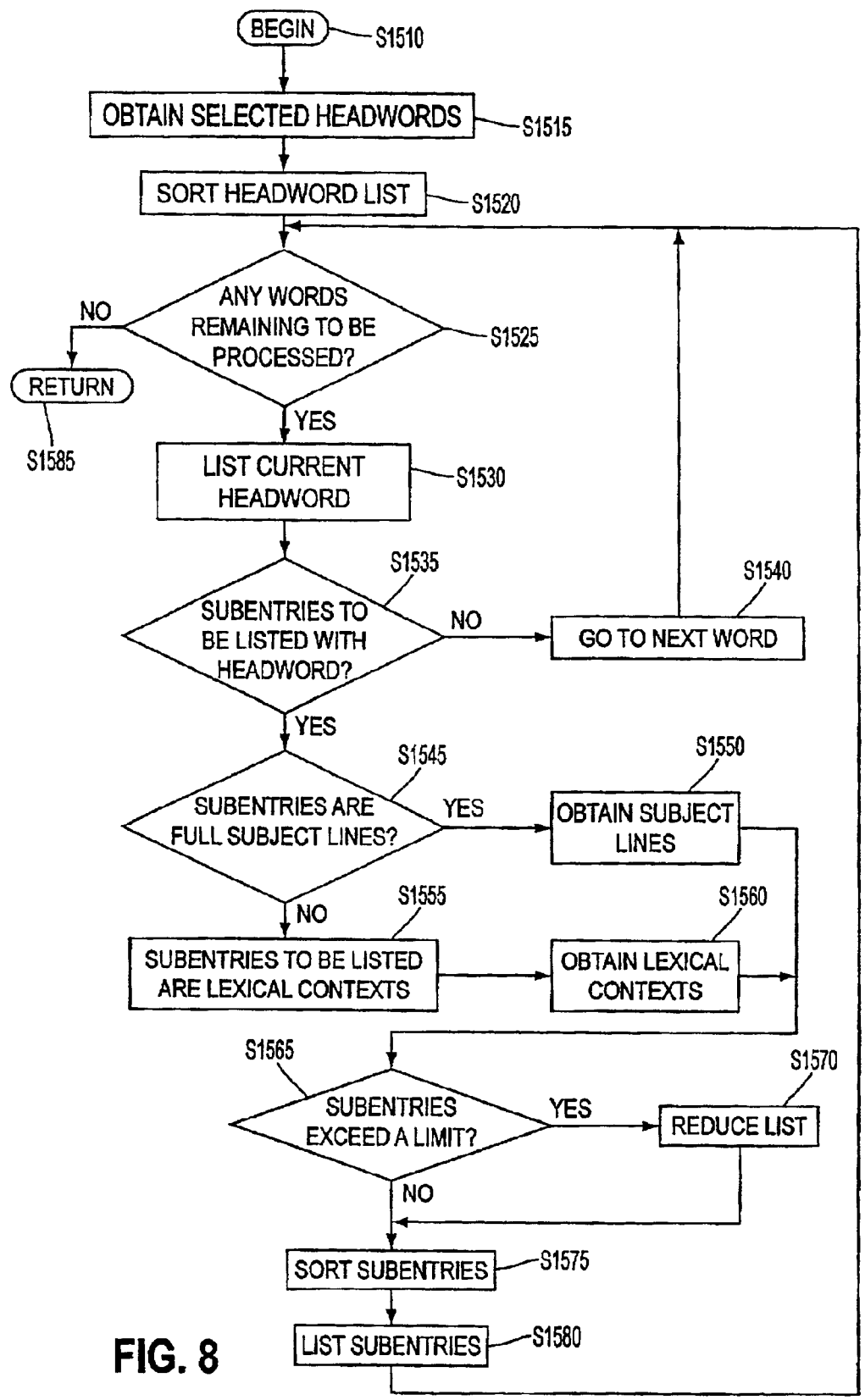
FIG. 8 is a flowchart for creating an index according to one exemplary embodiment of this invention.

FIG. 8 is a flowchart for creating an index as found in step S1500 of FIG. 3.

Control begins at step S1510 and proceeds to step S1515 where the selected headwords are obtained in the order they appear after ranking, if any. If the selected headwords were stems, they may be here expanded back to the original words from which they were derived. After the full set of headwords to be listed is obtained, control continues to step S1520.

In step S1520, the headword list resulting from step S1515 is sorted into alphabetical or other order associated with the embodiment or selected by the user. Control continues to step S1525.

In step S1525 a check is made as to whether there are any more headwords in the list obtained in step S1520 remaining to be processed. If more words remain to be processed, the control continues to step S1530. Otherwise the control continues to step S1585 where the control returns to step S1500 of FIG. 3 where the operation ends.

In step S1530, the current headword is listed in the index, and the listing may be accompanied by a link to some representation of the messages in the collection whose subject lines contain that headword. In this embodiment, the link is to a list of the first messages in the collection whose subject lines contain that headword, together with the initial fragments of those messages. The control then continues to step S1535.

In step S1535, a check is made as to whether subentries are to be listed with headwords in the index, and if so, what kind. If no subentries are to be listed with headwords in the index, control continues to step S1540 where the operation proceeds to the next word. Otherwise the operation continues to step S1545.

In step S1545, a determination is made as to whether the subentries to be listed are full subject lines associated with the headword. If the subentries to be listed are full subject lines, the control continues to step S1550 where the subject lines associated with the headword are obtained, and control continues to step S1565. Otherwise, control continues to step S1555.

In step S1555, the operation determines that the subentries to be listed are lexical contexts. Control then continues to step S1560 where the lexical contexts associated with the current headword are obtained and control passes to step S1565.

In step S1565, a check is made to determine if there is a limit on the number of subentries to be included in a subentry list, and if the number of subentries in the current subentry list exceeds that number. The limit, if any, on the number of subentries to be included in the subentry list may be a default value for the environment, or may be set by the user. If the number of subentries in the current subentry list exceeds this limit, if any, control continues to step S1570. Otherwise, control continues to step S1575.

In step S1570, the current subentry list is reduced to meet the limit. The reduction may be done by sorting the subentries alphabetically and selecting the first n, where n is the limit, or by selecting the subentries representing the most frequent subject lines, or by any other means of selection. Control then continues to step S1575.

In step S1575, the subentries to be listed are sorted in an order determined by the environment or requested by the user. This order may be alphabetic, by date of the first subject line containing the subentries, or by the number of non-unique subject lines containing the subentries, or any other order. Control then continues to step S1580.

In step S1580, each subentry to be listed is added to the index in the order determined in step S1575, and the listing for each subentry may be accompanied by links to the initial message associated with each unique subject line containing that subentry (there may be more than one), and a fragment of that message.

After the last subentry is added to the output list, if the subentry list has been limited, a continuation indicator may be added to indicate that an additional number of subentries have been omitted. Control then returns to step S1525.

Figure 9:
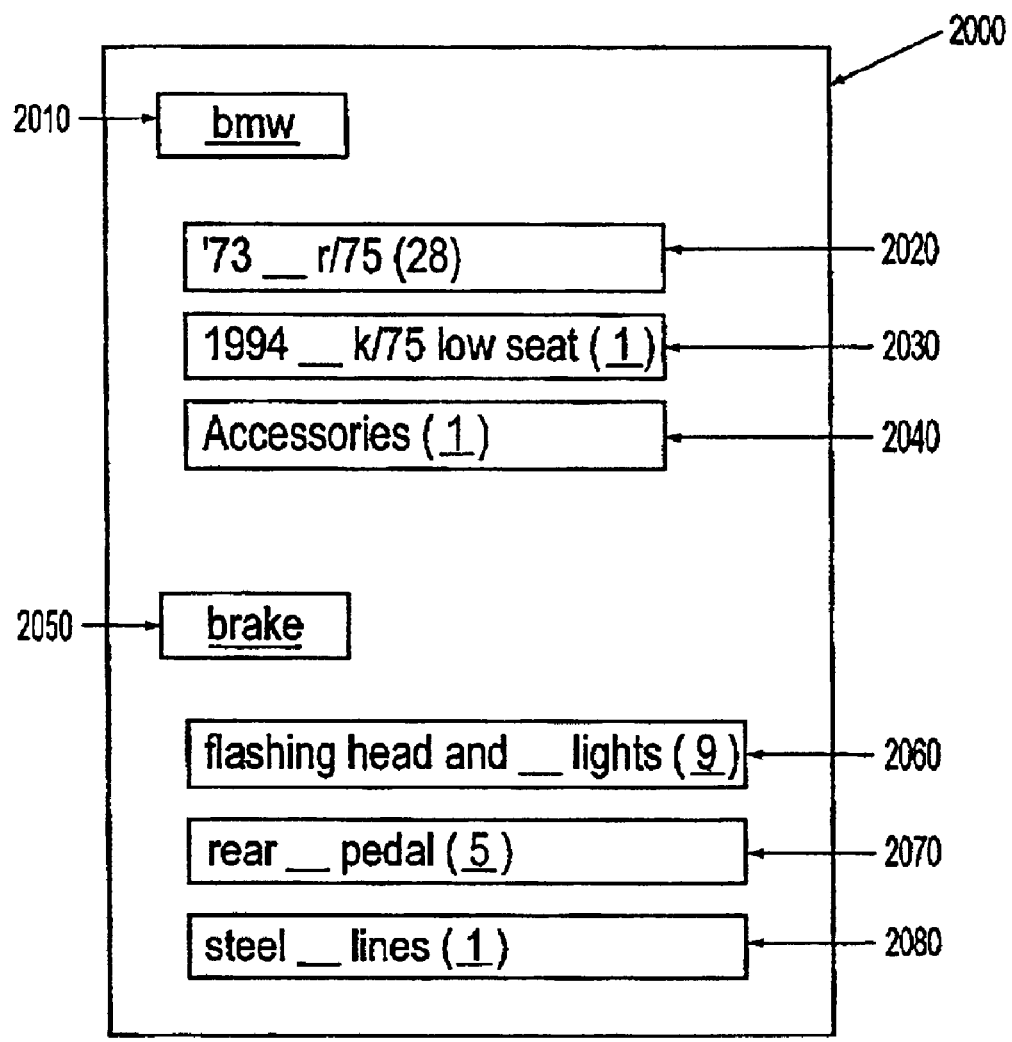
FIG. 9 illustrates an excerpt from a lightweight subject index that might be generated by one exemplary embodiment of this invention.

FIG. 9 illustrates an excerpt 2000 from a lightweight subject index that might be generated by one exemplary embodiment of this invention. Excerpt 2000 consists of headwords 2010 and 2050, and subentries 2020, 2030, 2040, 2060, 2070 and 2080. Headword 2010 is followed by subentries 2020, 2030, and 2040, each consisting of a lexical context in which headword 2010 was found in a subject line in the message collection and, in this embodiment, the number of messages in which the lexical context occurred in a subject line. In subentries 2020 and 2030, headword 2010 appears between other words in the lexical context, and has been replaced by underscores. In subentry 2040 the headword appears immediately outside the lexical context and thus no underscore is used.

Headword 2050 is followed by subentries 2060, 2070, and 2080, representing the lexical contexts in which headword 2050 appeared within subject lines. In all three subentries 2060, 2070, and 2080, the headword appears between other words of the lexical context, and thus is replaced by underscores.

Figure 10:
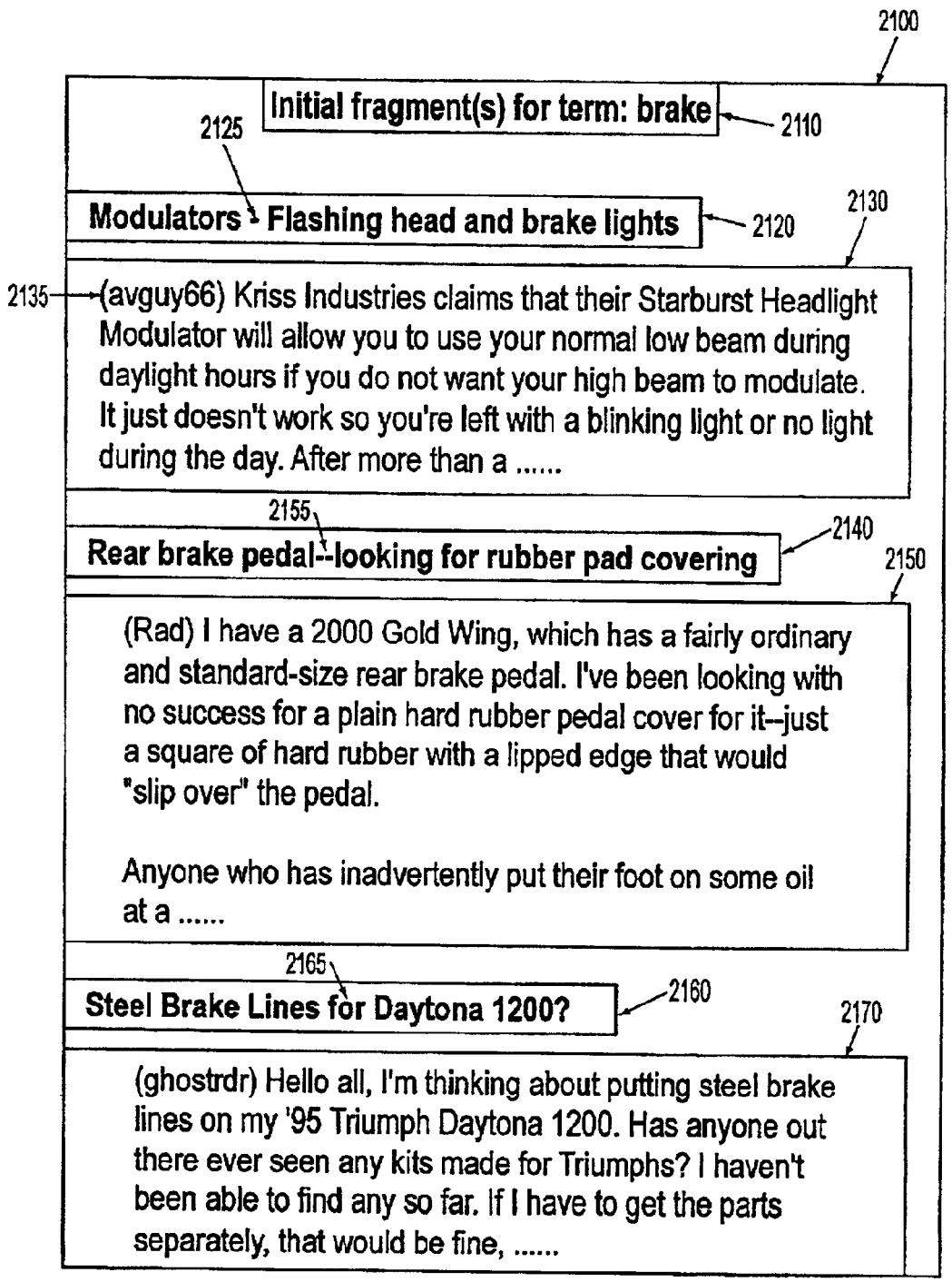
FIG. 10 illustrates the result of selecting a subject line link from a lightweight subject index that might be generated by one exemplary embodiment of this invention.

FIG. 10 shows a display 2100 of subject lines and initial fragments that might be obtained by one embodiment of this invention after selection by a user of headword 2050 of FIG. 8. Display 2100 consists of a title display 2110 containing the headword 2050, three subject lines 2120, 2140, and 2160, and three initial message fragments 2130, 2150, and 2170. Subject line 2120 is the subject line from which subentry 2060 of FIG. 8 was drawn.

The lexical context for headword 2060 of FIG. 8 consists of all the text surrounding headword 2060 up to the barrier 2125, which is the punctuation character "-". Initial message fragment 2130 is the initial text of the first message found in the corpus having subject line 2120. In this exemplary embodiment the display 2100 also contains an author name 2135. Similarly, subject line 2140 is the subject line from which subentry 2070 of FIG. 8 was drawn by locating the words surrounding headword 2060 up to the barrier 2155, which is also a punctuation character. Subject line 2140 is followed by initial message fragment 2150. Subject line 2160 is the subject line from which subentry 2080 was drawn by locating words surrounding headword 2070 up to the barrier 2165, which is a preposition. Subject line 2160 is followed by initial message fragment 2170.

As should be appreciated in various exemplary embodiments according to this invention, the light weight subject indexing system 100 and the user interface 10 can be incorporated into a single system, or the light weight subject indexing system 100 can be implemented using a programmed general purpose computer. However, the light weight subject indexing system 100 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 3–7 can be used to implement the light weight subject indexing system 100.

Each of the circuits 110–124 of the light weight subject indexing system 100 outlined above can be implemented as portions of a suitably programmed general purpose computer. Alternatively, circuits 110–124 of the light weight subject indexing system 100 outlined above can be implemented as physically distinct hardware circuits within an ASIC, or using a FPGA, a PDL, a PLA or a PAL, or using discrete logic elements or discrete circuit elements. The particular form each of the 110–124 of the light weight subject indexing system 100 outlined above will take is a design choice and will be obvious and predictable to those skilled in the art.

Moreover, the light weight subject indexing system 100 and/or each of the various circuits discussed above can each be implemented as software routines, managers or objects executing on a programmed general purpose computer, a special purpose computer, a microprocessor or the like. In this case, the light weight subject indexing system 100 and/or each of the various circuits discussed above can each be implemented as one or more routines embedded in the communications network, as a resource residing on a server, or the like. The light weight subject indexing system 100 and the various circuits discussed above can also be implemented by physically incorporating the light weight subject indexing system 100 into a software and/or hardware system, such as the hardware and software systems of a web server.

As shown in FIG. 2, memory 112 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 40 shown in FIGS. 1-2 can each be any known or later developed device or system for connecting a communication device to the light weight subject indexing system 100, including a direct cable connection, a connection over a wide area network or a local area network, a connection over an intranet, a connection over the Internet, or a connection over any other distributed processing network or system. In general, the communication link 40 can be any known or later developed connection system or structure usable to connect devices and facilitate communication.

Further, it should be appreciated that the communication link 40 can be a wired or wireless link to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for creating a light weight subject index, comprising:
   identifying, as candidate headwords, words in the subject lines of a collection of documents which are not listed in a user modified common word list;
   creating lexical contexts for identified candidate headwords;
   ranking the set of identified candidate headwords for a collection of documents and selecting among them for inclusion in an index; and
   listing selected candidate headwords based on the results of ranking and selection, wherein the lexical context for a candidate headword within a subject line is identified as the words to the left and the right of the candidate headword up to, but not including, a barrier word.

2. The method of claim 1, further comprising:
   creating the user modified common word list by modifying a list of common words by adding words to and/or subtracting words from the common word list.

3. The method of claim 1, wherein the candidate headwords for a document are identified by:
   scanning the subject line of the document to identify, as candidate headwords, those words that do not appear in the user modified common word list, and for each such word found;
   adding the word to an accumulated list of candidate headwords for the collection if the word has not been previously identified as a candidate headword;
   associating the entry for the word in the accumulated list with the subject line; and
   incrementing subject line occurrence counts for the word.

4. The method of claim 1 wherein if there are no non-barrier words to the immediate left and immediate right of the candidate headword, but there are non-barrier words beyond one or more barrier words either to the left or to the right of the candidate headword, the lexical context for the candidate headword is identified as the barrier words in the direction in which the non barrier words appear, plus the non-barrier words beyond those barrier words up to, but not including, the next barrier word.

5. The method of claim 1, wherein if there are no non-barrier words to the immediate left and immediate right of the candidate headword, but there are non-barrier words beyond the barrier words both to the left and to the right of the candidate headword, heuristic means are used to determine which direction is to be used in establishing the lexical context, and the lexical context is identified as consisting of the barrier words immediately following the candidate headword in that direction, plus the words beyond those barrier words up to, but not including, the next barrier word.

6. The method of claim 1, wherein if no content words are found on both the left and right of the candidate headword, the lexical context may be identified as including those barrier words.

7. The method of claim 1, wherein the candidate headwords are ranked based on count information obtained during candidate headword selection.

8. The method of claim 1, wherein the candidate headwords are ranked based on the number of unique subject lines in which a candidate headword occurs and the number of individual messages in which the candidate headword occurs in a subject line.

9. The method of claim 1, wherein the highest ranking headwords are selected up to a desired index size.

10. The method of claim 1, wherein each selected candidate headword is listed in a predetermined order followed by the lexical contexts in which the candidate headword appears.

11. The method of claim 1, wherein each selected candidate headword is listed in a predetermined order followed by the subject lines in which the candidate headword appears.

12. The method of claim 1, wherein the candidate headword is linked to a representation of the set of messages in whose subject lines the candidate headword appears.

13. The method of claim 1, wherein the lexical context in which a candidate headword appears is linked to a representation of the set of messages in whose subject lines the lexical context appears.

14. The method of claim 1, wherein the candidate headwords are listed in a user specified order.

15. The method of claim 1, wherein the number of lexical contexts that are listed below the candidate headword is limited.

16. A system for creating a user specified index, comprising:
   at least one user interface for specifying a desired index;

a document application system electrically connected to the at least one user interface; and an indexing system for creating the desired index, the indexing system comprising:

a candidate headword identification system for identifying candidate words in the subject line of a document which are not listed in a user modified common word list;

a lexical context system for creating a lexical context for an identified candidate headword;

a ranking system for ranking the set of identified candidate headwords for a collection of documents and selecting among them for inclusion in an index; and an index creation system for listing selected candidate headwords based on the results of ranking and selection, wherein the lexical context system identifies the lexical context for the candidate headword as the words to the left and the right of the candidate headword up to, but not including, a barrier word.

17. The system of claim 16, wherein the documents are stored in an archive.

18. The system of claim 16, wherein the document application system is a list server or a personal email application directly associated with and controlled by one of the at least one user interface.

19. The system of claim 16, wherein the indexing system is integrated with the document application system.

20. The system of claim 16, wherein the at least one user interface, the document application system and the indexing system are electrically connected by at least one communication link.

21. A light weight subject indexing system, comprising:

a candidate headword identification system for identifying candidate words in the subject line of a document which are not listed in a user modified common word list;

a lexical context system for creating a lexical context for an identified candidate headword;

a ranking system for ranking the set of identified candidate headwords for a collection of documents and selecting among them for inclusion in an index; and an index creation system for listing selected candidate headwords based on the results of ranking and selection, wherein the lexical context system identifies the lexical context for the candidate headword as the words to the left and the right of the candidate headword up to, but not including, a barrier word.

22. The system of claim 21, further comprising:

a user modified common word list system for creating the user modified common word list by modifying a list of common words by at least one of adding words to the common word list, subtracting words from the common word list, or both adding and subtracting words from the common word list.

23. The system of claim 21, wherein the candidate headword identification system scans the subject line of a document to identify as a candidate headword each word in the subject line that does not appear in the user modified common word list, and, for each candidate headword found in the subject line, adds the candidate headword to the accumulated list of candidate headwords for the collection if the word has not been previously identified as the candidate headword for the collection, associates the entry for the word in the accumulated list with the subject line, and increments subject line occurrence counts for the word.

24. The system of claim 21, wherein if there are no non-barrier words to the immediate left and the immediate right of the candidate headword, but there are non-barrier words to the words beyond the barrier words either to the left or the right of the candidate headword, lexical context system identifies, as the lexical context for the headword, barrier word in the direction in which the non-barrier words appear, plus the non-barrier words beyond those barrier words up to, but not including, the next barrier word.

25. The system of claim 21, wherein if there are no non-barrier words to the immediate left and the immediate right of the candidate headword, but there are non-barrier words beyond the barrier words either to the left or to the right of the candidate headword, the lexical context system uses heuristic means to determine which direction is to be used in establishing the lexical context, and identifies the lexical context as consisting of the barrier words immediately following the candidate headword in the direction, plus the words beyond those barrier words up to, but not including, the next barrier words.

26. The system of claim 21, wherein if there the subject contain only barrier words in addition to the candidate headword, the lexical context system may use the barrier words lexical context.

27. The system of claim 21, wherein the ranking system ranks the candidate headwords based on count information obtained during candidate headword selection.

28. The system of claim 21, wherein the ranking system ranks the candidate headwords based on the number of unique subject lines in which a candidate headword occurs and the number of individual messages in which the candidate headword occurs in a subject line.

29. The system of claim 21, wherein the ranking system selects the highest ranking headwords up to a desired index size.

30. The system of claim 21, wherein the index creation system lists each selected candidate headword in a predetermined order followed by the lexical contexts in which the candidate headword appears.

31. The system of claim 21, wherein the index creation system lists each selected candidate headword in a predetermined order followed by the subject lines in which the candidate headword appears.

32. The system of claim 21, wherein the index creation system links the candidate headword to a representation of the set of messages in whose subject lines the candidate headword appears.

33. The system of claim 21, wherein the index creation system links the lexical contexts in which the candidate headword appears to the set of messages in whose subject lines the lexical contexts appear.

34. The system of claim 21, wherein the index creation system lists the selected candidate headwords in a user specified order.

35. The system of claim 21, wherein the index creation system limits the number of lexical contexts that are listed below the candidate headword.

* * * * *